Patented Apr. 19, 1949

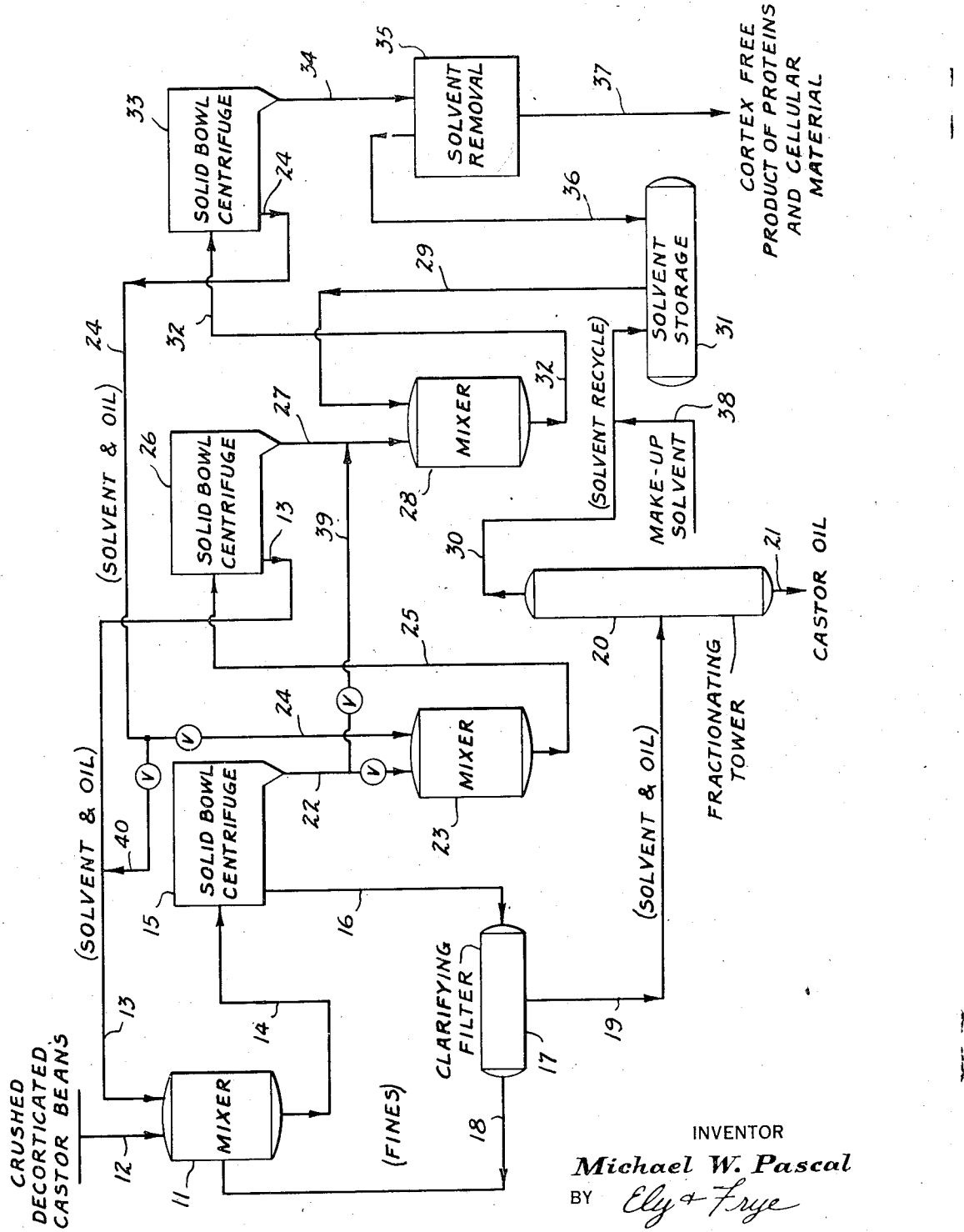

2,467,402

UNITED STATES PATENT OFFICE 2,467,402

RECOVERY OF PROTEINS FROM CASTOR BEANS

Michael W. Pascal, Shaker Heights, Ohio, assignor to The Sherwin-Williams Co., Cleveland, Ohio, a corporation of Ohio Application January 13, 1948, Serial No. 2,043

9 Claims. (Cl. 106—154)

This invention relates to improvements in processes for recovering a cortex-free proteinaceous material from castor beans and more particularly to processes for producing a clean, white, proteinaceous product from castor beans without degrading the protein or substantially altering its natural dispersion characteristics.

After removal of the outer husk in accordance with regular commercial practice, the castor bean comprises a brown shell or cortex, having little intrinsic value, and a kernel which contains from about 50% to about 65% by weight of castor oil, the remainder being composed of various types of proteins and other cellular material including cellulose, mucillaginous substances, carbohydrates and the like. Previously, the proteins in castor beans have not been commercially recoverable in a form free from the cortex, which rendered the proteins unfit for nearly all of the many industrial uses for proteins.

Heretofore the inability of the prior art to obtain cortex-free castor proteins in commercially feasible production has been attributable to the phytotomy of the castor bean kernel. The meat of the caster bean kernel is essentially comprised of discontinuous solid constituents held together by the oil, acting as a binder. Thus, release of the oil, by pressing or, particularly, by solvent extraction, causes disintegration of the kernel meat into oil and what are commonly called "fines." Although the term "fines" is actually somewhat of a misnomer it will be used throughout this description since it is commonly used by those skilled in this art when referring to the castor solids which are extremely difficult to separate from the oil or miscella.

The term "fines" includes not only the small fibers and minute, but discrete, particles which are larger than colloidal particles, but also stringy, phlegm-like gelatinous masses comprised of oil or miscella and seed solids. Although the actual solids in such phlegms are of, or approach, a colloidal size, the phlegms are of substantial size and may entrain and enmesh the discrete particles. Thus, if the fines constitute a substantial proportion of the extracted oil or miscella, they form substantially unmanageable masses comprised of fibers and discrete particles bound together by the phlegms.

Because of the problems presented by the fines, it has heretofore been necessary, in recovering oil from castor beans, to crush the beans without removing the cortex. When using the well-known cage press, for example, the relatively very coarse cortex particles served to hold the fines in the cage during the pressing operation and during the optional subsequent solvent washing step. Without having the cortex present, it was impossible to hold the fines in the cage, and the extracted oil was rendered unfit for most commercial uses unless a difficult filtration step was subsequently employed to remove the fines from the oil. With the cortex present, however, the fines are retained effectively in the press cake but the proteins recovered are contaminated by the cortex particles which cannot be economically removed and which render the protein product unfit for most commercial uses.

The crushed cortices of castor beans impart a brown discoloration to the otherwise white or very light colored proteinaceous material and greatly reduce the purity of the proteinaceous product. This prevents the use of the proteinaceous products containing cortex in nearly all industrial processes, such as the manufacture of coating compositions, paper, sizes, adhesives and the like, since the cortex particles are insoluble in the various vehicles and solvents and cause lumps and discoloration in the final products.

Such fines as do escape from the cage presses into the extracted oil or miscella must subsequently be removed in a polishing or clarifying filter. Such fines are usually the phlegms which contain only a minor proportion of actual solids but contain a substantial amount of oil and thus cannot be discarded or employed for the recovery of uncontaminated cortex-free proteins without an uneconomic loss of oil. To recover the oil in the fines removed by the polishing filter, such fines are either returned to the system, where they become contaminated with cortex or they are processed in filters which employ filter aids, such as clay, diatomaceous earth or the like. Such filter aids ruin the proteinaceous filter cake for any economic use except use as a fertilizer.

Another serious disadvantage of the prior art processes employing any kind of pressing operation resides in the fact that, when the oil is expressed from the beans, the meal is generally heated to a temperature of about 150° C., or higher, due to friction developed during the pressing operation. Temperatures of this order cause degradation and deterioration of the proteins so that their solubility and dispersibility in aqueous liquids is greatly impaired or even completely destroyed. This obviously precludes the use of the recovered proteins for most purposes.

In solvent extraction processes, unless the cortex was crushed with the kernels, it has heretofore been impossible to remove the fines from the solvent and dissolved oil in any practical manner. When decorticated castor beans were treated in systems employing filters, the disintegrated protein and cellular material first passed through the filters and then rapidly clogged the filters and prevented any filtering action. Even when perforate bowl centrifuges or centrifugal filters were used, clogging also occurred so rapidly that the process was impractical. By retaining cortex with the seed solids, the fines (including proteins) and cortex could be separated from the oil by the use of conventional filters, since the cortex particles served the function of a filter aid preventing clogging of the filter by the fines. However, the proteins in the recovered solids were contaminated with cortex. With all known prior art processes, recovery of castor proteins free from cortex or other undesirable contaminants has been impossible by any practical or economic means.

According to the present invention, all of these disadvantages are overcome, and a substantially pure proteinaceous product of good color and dispersibility in aqueous liquids is obtained. Through use of the present invention, large quantities of proteinaceous materials from castor beans become available for the first time for many uses, including paints and other coating compositions, binders, adhesives, fillers for plastics, and the like.

In carrying out the present invention, the castor beans from which the husks have been previously removed are decorticated in any conventional manner to remove the cortex, and the kernels are then crushed and treated with a solvent in two or more stages to extract the oil therefrom. As stated before, the proteins and cellular materials of the kernal disintegrate upon contact with the solvent and become very finely divided, the particles having, for the most part, substantially colloidal dimensions.

The mixture of oil and solvent must be removed from the castor proteins and cellular material as completely as possible in order to recover a high yield of solid materials substantially free from oil and solvent.

In many arts, the separation of two or more materials is obtained by utilization of a difference in particle size, as by screening, or, where one of the materials is a liquid, by filtering in a pressure, vacuum, or centrifugal (perforate bowl) filter. In other arts, separation is obtained by utilization of differences in specific gravities, as by centrifuging in a solid bowl centrifuge or by allowing the heavier components to settle in a gravity settler or a mechanical thickener.

None of the above general procedures suggest a solution to the problem of separating the oil and solvent from the disintegrated solid materials, since the solids include colloidal fines which form gelatinous masses having specific gravities equal to or even slightly less than the specific gravity of the liquid medium. In the usual pressure or vacuum filters, the phlegm-like fines, which result from disintegration of the seed solids upon contact with an oil solvent, substantially completely clog the filters almost simultaneously with the establishment of effective filtering. The usual perforate bowl type of centrifuge, or centrifugal filter, also fails to perform the desired separation by first passing a substantial quantity of the fines and then rapidly clogging. It has been found, however, that a continuous solid bowl centrifuge will effectively separate the solvent-oil solution or miscella from the proteinaceous fines. This is surprising because, when processing liquids and slurries, separation in a solid bowl centrifuge has been assumed to be dependent upon a difference in specific gravity of the separated components. Though the explanation is obscure, it is believed that this type of centrifuge is operative in the present process because both the miscella, and the dispersed floccules are forced toward and along the wall of the rotating solid bowl. Since the miscella is less viscous, it can flow in and between the floccules toward and along the wall of the bowl while the floccules and fines are compacted, thus increasing their density. This is possible because the liquids need not pass through an accumulated body of solids, as in the case of filters. Whatever the explanation may be, however, it has been found that substantially all of the oil component of the castor bean kernels can be effectively removed from the proteinaceous and cellular material with substantially no loss of the solid materials.

In carrying out the invention, the separation is accomplished in two or more stages, the solids and miscella flowing countercurrent between each stage. Each stage includes the step of mixing the decorticated and crushed castor beans (in the initial stage) or the solid material from the preceding stage (in a subsequent stage) with a miscella or, in the final stage, with substantially pure (i. e. oil-free) solvent. The miscella used in the stage or stages preceding the final stage is derived from the next succeeding stage. The proteinaceous material, oil and solvent in each stage are passed concurrently through a continuous solid bowl centrifuge to separate the proteins and occluded oil from the solvent and oil dissolved therein. The number of stages employed between the initial stage and the final stage may be increased or decreased depending on the type of solvent used, the temperature at which the steps are carried out and the desired purity (i. e. freedom from oil) of the final proteinaceous product.

So that the invention may be more clearly understood, reference will now be made to the accompanying drawing which diagrammatically illustrates a system for removing oil from the proteinaceous materials contained in decorticated castor beans.

The decorticated castor beans, after being crushed or ground into a pulpy, buttery mass, are introduced into a mixer 11 through line 12. A solvent solution comprising heptane and some extracted oil from a subsequent stage is introduced through line 13 to mixer 11. The mixer is provided with conventional means for stirring and agitating the mixture. When the pulpy mass of castor beans has been thoroughly mixed with the solvent solution, or miscella at a temperature of between about 40° C. and about 75° C., it is passed through line 14 to a continuous solid bowl centrifuge 15. A temperature of 50° C. results in a very efficient extraction. The centrifuge effects a separation between the partially deoiled proteinaceous material and the miscella containing the solvent and the extracted oil. This miscella contains a higher proportion of oil than the solvent solution which is introduced into the mixer 11 through line 13. The miscella is withdrawn from the centrifuge 15 through line 16 and is transferred to a clarifying filter 17 of a conventional type for the purpose of removing the small amount of fines which may still be present in the miscella. These fines may be returned through line 18 to the mixer 11 for further treatment. The clarified miscella is then passed through line 19 to a fractionating tower 20 for recovery of the solvent, the castor oil being withdrawn through line 21.

The partially deoiled protein material is withdrawn from the continuous solid bowl centrifuge 15 through line 22 and is introduced into a second mixer 23, which may also be provided with a conventional stirring device. A solvent solution or miscella, containing a smaller amount of oil than the miscella in line 13, is introduced through line 24 to the mixer 23 for further extracting oil from the proteins introduced through line 22. The mixer is maintained at a temperature similar to that employed in the first stage. After the miscella and proteins have been thoroughly mixed, the mixture is transferred through line 25 to a second continuous solid bowl centrifuge 26. This centrifuge effects a separation similar to that effected in centrifuge 15. The miscella is withdrawn from the continuous centrifuge 26 through line 13 for introduction into mixer 11 for the initial extraction of the crushed decorticated castor beans. The proteinaceous material, from which a large proportion of the oil has been extracted, is withdrawn from the centrifuge 26 through line 27 and is introduced into another mixer 28 where it is mixed with fresh solvent introduced through line 29. As in the case of mixers 11 and 23, an elevated temperature is maintained in mixer 28 in order to obtain efficient extraction of the oil from the proteins.

The solvent, which is removed from the miscella in the fractionating tower 20, is withdrawn from the tower through line 30 and passed to a solvent storage tank 31. The solvent is withdrawn from this tank through line 29 and is introduced into the top of mixer 28.

The mixture of solvent and protein material in the mixer 28 is then passed through line 32 to a third continuous solid bowl centrifuge 33 for separation, as described hereinbefore. The miscella is withdrawn from the centrifuge 33 through line 24 and introduced into the mixer 23 where it serves as the solvent extraction agent for the material which is withdrawn from continuous solid bowl centrifuge 15. The protein material is withdrawn in a substantially oil-free condition from the centrifuge 33 through line 34 and passed to a stage for removing any remaining solvent. This stage is indicated in the drawing by a vessel 35, although various procedures may be followed for the removal of solvent from proteinaceous product. The solvent which is removed in the vessel 35 is returned to the solvent storage vessel 31 through line 36. The remaining protein material is withdrawn from the vessel 35 through line 37 in a substantially solvent-free and oil-free condition and consists almost entirely of proteinaceous material and minor amounts of fine cellular material. Losses of solvent which may occur through leaks in the system or because of incomplete removal of solvent from the oil in the fractionating tower 20 can be made up by the introduction of fresh solvent into the system through line 38.

It will be seen from the foregoing that, in general, the flow of solvent through the system is countercurrent to the passage of the crushed castor beans, although the flow is concurrent within each stage.

The foregoing description of the process relates to a three stage system in which the proteinaceous material of the castor bean is solvent extracted and separated from the miscella three times. It will be obvious that four or more stages may be used when desired and, also, that as few as two stages may be used. In the latter case, the proteinaceous material from the centrifuge 15 may be passed directly to the final mixer 28, for instance through lines 22, 39 and 27, and the miscella from the final continuous centrifuge 33 may be passed directly to the initial mixer 11, for instance, via lines 24, 40 and 13, thereby eliminating the intermediate stage which includes mixer 23 and centrifuge 26.

Solvents which can be used effectively for extracting castor oil from the castor proteins are heptane, hexane, isomers thereof, halogenated aliphatic hydrocarbons, aromatic hydrocarbons such as benzene and substituted benzene and the like, although it has been found that heptane is particularly suitable. Of course, any solvent which is miscible with castor oil and inert both to the oil and the proteins under the conditions of treatment can be used. It is desirable, however, that the boiling point of the solvent be low enough to permit vaporization thereof in tower 20 without harmful effects on the castor oil. It will be understood of course that commercial grades of the above solvents can be used even though other compounds may be present in varying amounts.

The temperatures employed in the system will of course vary depending upon the solvent used. However, the temperature must be between the boiling point of the solvent under the operating conditions and a temperature at which the castor oil is at least partially miscible with the specific solvent.

Although varying pressures can be used for this process it has been found that atmospheric pressure is most practical when using heptane as a solvent at a temperature in the vicinity of 50° C.

It is desirable to use from about 1½ to about 5 times as much solvent, by weight, as crushed decorticated castor beans, although 2½ times as much solvent is generally sufficient, in a system as shown in the drawing, to remove substantially all of the oil from the proteins and cellular material of the castor bean.

The proteinaceous product according to the present invention not only has the advantage of being substantially free from oil and cortex but has the additional advantage that 90 to 95% of the protein content of the product is dispersible in a weakly alkaline solution as compared to about 3% of the protein contained in the product produced by the conventional cage press process.

The term "decortication," as used herein, has reference to the removal of the cortex layer of the castor bean, and not to the removal of the outer husk, which has no value as a source of oil or protein and is normally removed from the bean before processing by any known commercial operations for recovering either castor protein or castor oil or both.

Various conventional elements have been omitted from the drawing for the sake of simplicity, but it will be obvious to one skilled in the art that various valves, metering devices, temperature control and indication devices, pressure indicators, pumps and the like are normally employed. Such details for controlling the process may be varied widely without departing from the spirit or scope of the invention.

I claim:

1. A process for recovering substantially oil-free, cortex-free proteinaceous material from castor beans comprising treating decorticated and disintegrated castor beans in a series of at least two successive stages, each stage comprising preparing a slurry of decorticated and disintegrated castor bean material and a solvent for castor oil, compacting the proteinaceous material of the slurry upon an imperforate surface while subjecting the slurry to centrifugal force to separate a substantial quantity of the solvent-oil solution from the compacted proteinaceous material, moving the proteinaceous material and solvent for the castor oil countercurrent between stages and recovering substantially oil-free proteinaceous material from the final stage.

2. A process as claimed in claim 1 and further comprising the step of recovering solvent for the castor oil from the solvent-oil solution obtained from the initial stage, said recovered solvent being employed in the final stage, and the solvent-oil solution separated in the final stage being employed as a solvent in a preceding stage.

3. A process as claimed in claim 2 wherein the recovered solvent is substantially oil-free solvent.

4. A process as claimed in claim 1 wherein the step in each stage of compacting the proteinaceous material is carried on continuously.

5. A process as claimed in claim 1 wherein the compacted proteinaceous material and the solvent-oil solution are separately removed from the imperforate surface in each stage by continuously moving the compacted proteinaceous material in one direction along said surface and continuously moving the solvent-oil solution in a different direction along said surface.

6. The process as claimed in claim 1 wherein each stage is carried out at a temperature of from about 40° C. to about 75° C.

7. The process as claimed in claim 1 wherein approximately 2½ times as much solvent by weight is introduced in said final stage as decorticated beans are introduced in said initial stage.

8. The process as claimed in claim 1 wherein the solvent is essentially heptane.

9. The process as claimed in claim 1 wherein the solvent remaining in the proteinaceous material recovered from the final stage is removed from said material and returned to at least one of said stages.

MICHAEL W. PASCAL.

REFERENCES CITED

The following references are of record in the file of this patent:

UNITED STATES PATENTS

| Number | Name | Date |
|---|---|---|
| 427,410 | Forbes | May 6, 1890 |
| 1,653,201 | Bollmann | Dec. 20, 1927 |
| 1,865,615 | Coleman | July 5, 1932 |
| 2,164,189 | Hund et al. | June 27, 1939 |
| 2,308,559 | Winkler | Jan. 19, 1943 |

OTHER REFERENCES

Chem. and Met. Engineering, July 1943, pp. 119 to 126.